Dec. 11, 1945.  C. E. HEMMINGER  2,390,708
REGENERATING CONTACT MATERIAL
Original Filed April 1, 1939  3 Sheets-Sheet 2

Charles E. Hemminger Inventor
By _____ Attorney

Dec. 11, 1945.   C. E. HEMMINGER   2,390,708
REGENERATING CONTACT MATERIAL
Original Filed April 1, 1939   3 Sheets-Sheet 3

Patented Dec. 11, 1945

2,390,708

UNITED STATES PATENT OFFICE 2,390,708

REGENERATING CONTACT MATERIAL

Charles E. Hemminger, Westfield, N. J., assignor to Standard Oil Development Company, a corporation of Delaware Original application April 1, 1939, Serial No. 265,388. Divided and this application April 19, 1943, Serial No. 483,602

22 Claims. (Cl. 252—242)

This invention relates to improvements in the continuous conversion of relatively heavy hydrocarbons into valuable hydrocarbon fractions such as those boiling within the gasoline range.

The object of this invention is to provide a continuous catalytic process using such suitable apparatus including a catalyst conveying means as will enable efficient and economical treatment of hydrocarbons.

In carrying the invention into effect, a catalyst conveying means, such as a Redler conveyor of the loop type, is employed to move the catalyst through a cracking or reaction zone. The conveyor lifts the catalysts against the oil vapors which flow generally downwardly but with a stepwise to and fro transverse motion across the vertical column of rising catalyst, thus affording a substantially right angular flow of oil vapors with respect to the moving catalyst. Furthermore, the oil vapors enter the cracking zone at a point where the catalyst is least effective, i. e. contains greatest amount of poisons or contaminants and cracked vapors leave the reaction zone at a point about where fresh catalyst enters the reaction chamber. The catalyst which may be a solid siliceous material, a zeolite, coke, bauxite, clay or the like, is as indicated, during contact with heated hydrocarbon oil fluid, poisoned or contaminated with a carbon containing material and consequently requires regular revivification after it has accumulated about 2% by weight or more of the poisons.

The poisoned catalyst leaving the cracking zone is discharged into an inclined chute or casing where it may be purged to drive off volatile hydrocarbons and then passes downwardly by gravity through a regeneration chamber comprising a plurality of vertical ducts disposed between baffled flues. A hot combustion supporting gas flows generally upwardly but also laterally to and fro through the down flowing catalyst in a substantially right angular flow with respect to the catalyst. The walls forming the catalyst ducts are perforated thus permitting the combustion supporting gas to flow into and out of the catalyst ducts. The result of the treatment of the poisoned catalyst with the combustion supporting gas is to burn off and/or oxidize the catalyst poisons or contaminants causing impairment of its efficiency. Fresh catalyst is collected at the bottom of the regeneration zone and after purging with superheated steam or the like, is discharged into the tail portion of the conveyor and hoisted into the cracking zone as fresh catalyst, thus completing a cycle of operations.

In the accompanying drawings, which illustrate one embodiment of my invention, selected for purposes of illustration;

Figure 1:
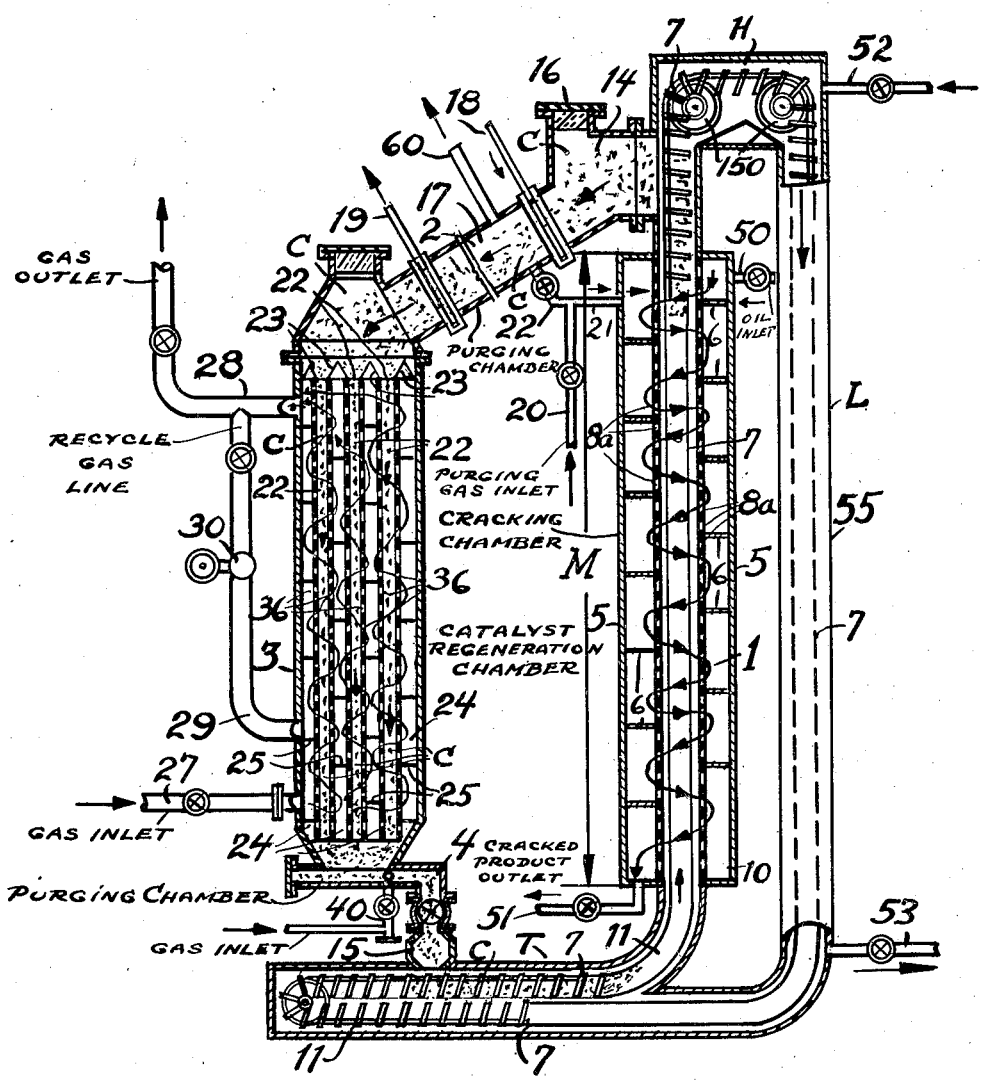
Fig. 1 is an elevational view partly in section, of an oil cracking apparatus, suitable for carrying out this invention but not including the conventional preheating, fractionating and refining apparatus.
Figure 2:
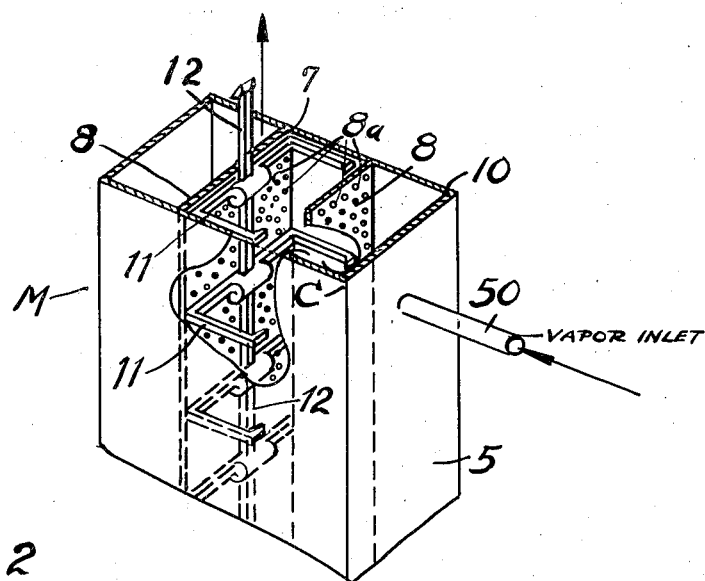
Fig. 2 is a perspective view of a fragment of the cracking zone in the region of the oil inlet.
Figure 4:
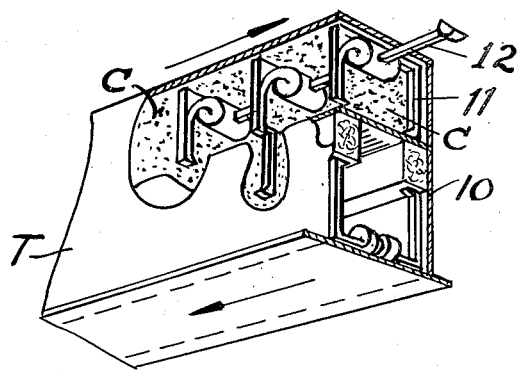
Fig. 4 is a fragmentary perspective view of the tail portion of the conveyor.

Referring to Figs. 1 to 4 and speaking generally at first, the cracking apparatus comprises a cracking zone 1, a catalyst purging chamber 2, a catalyst regeneration chamber 3, and a second purging and conditioning chamber 4. The cracking zone 1 consists of two elongated flues 5 carrying a plurality of baffles 6, constructed and arranged on opposite sides of conveyor 7. Referring at this point to Fig. 2 which shows an arrangement of conveyor and flues coming within the purview of this invention, the flues 5 have the same depth as the casing of conveyor 7, as shown. The walls 8 of the conveyor 7 carry perforations 8a, thus permitting interflow of oil vapors between flues 5 and conveyor 7 carrying catalyst C. In other words, flues 5 and the conveyor 7 have common walls 8 carrying perforations 8a which perforations may be about 3/16" in diameter and may be spaced apart from center to center an inch or so.

The conveyor, as a whole comprises a tail portion T, a main portion M, a head portion H and a loop L (see Fig. 1). As may be seen from Figs. 2 and 4, the conveyor consists essentially of a casing or wall portion 10 having four walls and may be of steel or cast iron construction. The conveying element consists of a plurality of detachable U-shaped flights 11 spaced apart and connected by links 12. (See Figs. 2 and 4).

The spent catalyst in cracking zone 1 is elevated by conveying flights 11 to the height of reservoir 14 into which it is discharged and the flights 11 then pass over the sprockets 150 located in the head portion H, then pass through the return loop L, finally arriving at tail portion T beneath hopper 15 for reloading with fresh catalyst.

Freshly prepared catalyst may be added to the system through manhole 16 of reservoir 14, or undesired catalyst may be there withdrawn.

Purging chamber 2 is formed by elevatable gates 18 and 19 and the portion of casing 17 therebetween. Purging gas inlet 20 is in communication with valved conduit 21 leading into cracking zone 1, as well as conduit 22 leading into purging chamber 2. It is seen from Fig. 1 that catalyst C may be admitted for purging by gravity flow into chamber 2 by elevating gate 18. After the purging operation, gate 18 is lowered until it divides or separates the catalyst in 14 from that in chamber 2, and then the gate 19 is elevated permitting flow of catalyst into regeneration chamber 3. When all of the catalyst has been discharged from chamber 2, gate 19 is again lowered and another charge of catalyst is admitted to the chamber 2 from reservoir 14 for purging. Reservoir 14 should be sufficiently large to permit continuous discharge of catalyst from conveyor 7 since, as explained, the operation of chamber 2 in purging is on intermittently moving catalyst.

The catalyst discharged from the chamber 2 falls by gravity through regeneration chamber 3 in ducts 22, the flow being directed into said ducts by virtue of crown pieces or caps 23. Each duct 22 is separated from the next duct by flues 24 carrying baffles 25 (see Fig. 3). The vertical walls forming the catalyst ducts 22 carrying perforations 36 throughout their length and breadth. These perforations may be about $\tfrac{3}{16}$" in diameter and spaced apart an inch or so, from center to center. Flues 24 carry banks of tubes 26 through which water or some other cooling fluid may be circulated.

Referring now to Fig. 1, the regeneration chamber 3 is provided with a regeneration gas inlet 27, with recycle regeneration gas line 29 carrying pump 30 and with discharge conduit 28 through which gaseous products or vapors not to be recycled are withdrawn from the system.

Figure 3:
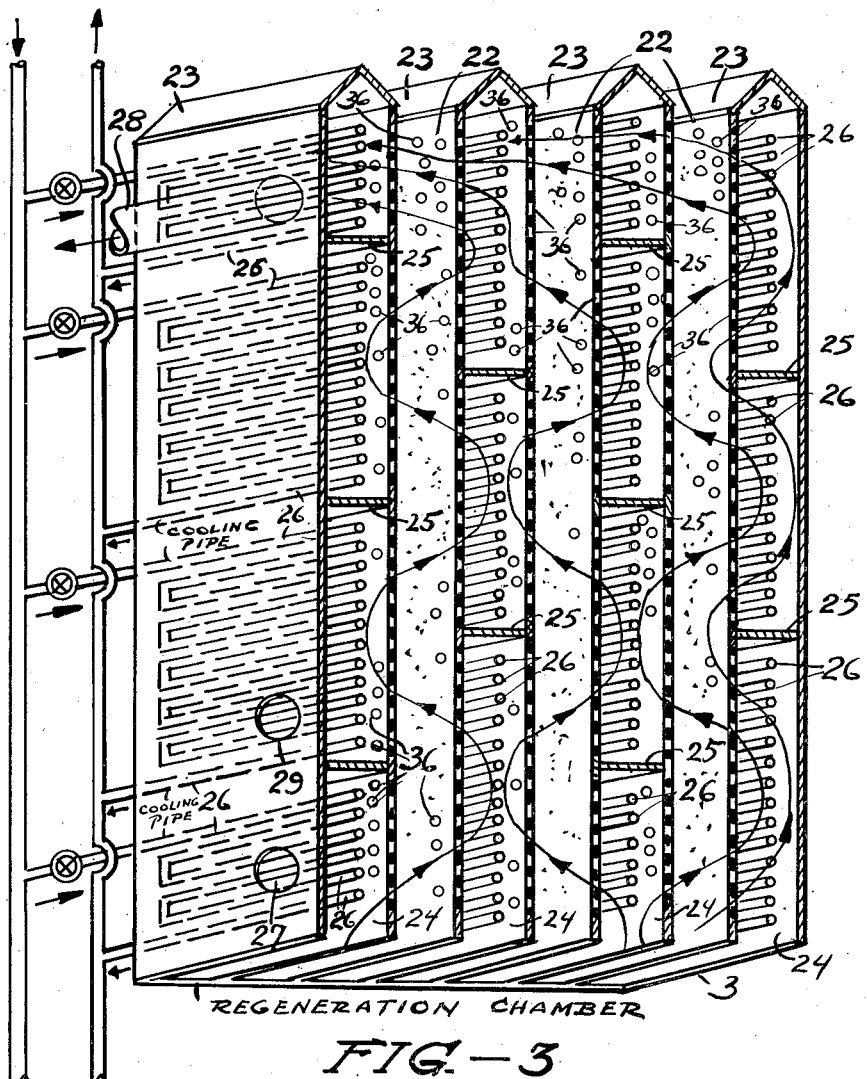
Fig. 3 is a perspective view of the regeneration chamber interior showing the arrangement of catalyst ducts, flues, baffles and cooling tubes.

As indicated by the directional arrows in Figs. 1 and 3, the construction and arrangement of flues and baffles causes a generally upwardly, but also to and fro transverse flow of regeneration gas through the downcoming catalyst.

A receiving vessel 4 forms a temporary repository for catalyst regenerated in chamber 3. The receiving vessel is provided with purging gas inlet 40. The purged catalyst is returned to the tail section T of conveyor 7 through hopper 15.

In order to give a specific example illustrating the present invention in actual operation, the following description is given with the explanation that the invention is not limited by the precise details of said specific example.

Heated hydrocarbon vapors from any conventional source are introduced in chamber 1 through valved conduit 50 near the top of the chamber. The hydrocarbon vapors may be a gas oil cut heated to a temperature of about 820° F. or thereabouts. The heated vapors in the upper portion of flues 5 are caused by baffles 6 to flow laterally through the perforations 8a in the walls 8 of the conveyor casing into one side of the rising solid column of catalyst C and to flow out through the opposite perforated wall 8 into the opposite flue, thence reverse its direction and flow through the column of catalyst in the opposite direction, but at a lower level, into the opposite flue. This type of flow continues through the whole length of the column of catalyst until finally the cracked products are withdrawn through conduit 51. The temperature of the catalyst should be in the neighborhood of 800° F. to 830° F. and the pressure in the cracking zone should be about 5 lbs. per square inch on the gauge, but, of course, good results can be obtained using lower pressures or considerably higher pressures. It is advisable, though not necessary to introduce direct steam into the cracking zone as through pipes 20 and 21. This steam actually assists in the cracking reaction and further tends to counteract or prevent the tendency of oil vapors to ascend toward chamber 14. Furthermore, housing 55 of loop portion L of conveyor 7 is preferably filled with steam admitted through inlet 52 and withdrawn through 53. This steam also forms a seal preventing the escape upwardly of oil vapors in the upper portions of flues 5.

Since the oil cracking reaction is endothermic, it is desirable to dispose banks of tubes (not shown) in flues 5 containing or flowing therethrough superheated steam and to cause the oil vapors to flow through said banks of tubes to compensate by heat transfer from the superheated steam for the heat lost during the cracking operation. The cracked vapors are withdrawn for fractionation through valved conduit 51.

The column of catalyst proceeding upwardly is progressively contaminated by deposits resulting from the cracking operation until finally it becomes necessary to regenerate it. The length of the catalyst column should be such that too great an amount of deposit was not present on the catalyst before it was removed from the cracking chamber. That is to say, efficient operation may be achieved where the cracking zone is say 30 to 50 feet long. Furthermore, a catalyst column cross-sectional area of 2 feet by 4 feet gives good results.

The poisoned catalyst which has been lifted through the cracking zone is discharged into reservoir 14 and eventually flows into purging chamber 2. The operation in chamber 2 is intermittent and since catalyst is continuously discharged into 14, it is apparent that 14 must be of sufficient relative size with respect to chamber 2 to accommodate this situation.

Assuming chamber 2 is empty, the same is filled by lifting gate 18 to the height shown in Fig. 1, while gate 19 is lowered. When the chamber 2 is filled, gate 18 may be lowered. A purging gas, such as superheated steam at a temperature of say between 700° F. and 830° F. is forced into chamber 2 through conduits 20 and 22 and withdrawn through exhaust line 60. Instead of using steam, flue gas, nitrogen, carbon dioxide or mixtures thereof may be used for purging.

Following purging, the catalyst is discharged into regeneration chamber 3 by raising gate 19. The catalyst falls through ducts 22 to a receiver 4. Meanwhile, air or some oxygen-containing gas is admitted through line 27 into the bottom of the regeneration chamber. This air or other regeneration gas may have an inlet temperature of about 700° F. and is caused to flow laterally through descending catalyst and also stepwise upwardly by the baffles 25 toward outlet pipe 28. The regeneration gas flows through the perforations 36 in the walls of the catalyst ducts from the flues into the ducts and out again in a cross-wise reversing flow. Arriving at about the region where the inlet pipe 29 is attached to the regeneration chamber, the air or other gas is admixed with recycle gas consisting largely of carbon dioxide and steam. The admixture causes a reduction in the oxygen concentration of the regeneration gas to about 10% more or less.

At about midway between the point where recycle gas enters chamber 3 and the products of combustion are withdrawn, the oxygen concentration should be about 5%, whereas near the top of the regeneration column, the oxygen concentration is about 2%. The advantage of this oxygen concentration gradient is that the most highly contaminated catalyst encounters a low oxygen concentration, while toward the end of the regeneration a high oxygen concentration, say 20% or more, is encountered by the catalyst in removing the last traces of tar material or coke. The oxygen concentration of the regeneration may vary from 30% at the inlet to 10% at the outlet. It may be advisable to, in certain installations, provide two or more recycle gas inlets at various levels in regeneration chamber 20 to obtain the desired oxygen concentration gradient. It may also be advisable to provide ducts 22 with a number of steeply inclined baffles to cause the downcoming catalyst to describe a somewhat tortuous path.

The oxygen-containing gas or the pure air, as the case may be, causes, upon contact with the catalyst, combustion or oxidation or distillation of the poisons or contaminants of catalyst C during its passage through chamber 3. The temperature of the combustion reaction can be controlled by circulating a cooling fluid such as cold water through coils 26 (see Fig. 3). Temperature indicating devices, such as thermocouples (not shown) should be disposed in the flues at several points through the length of the regeneration chamber and, based on such readings or indications, the temperature of the catalyst at any time during regeneration should be maintained below 1150° F. in the case of most catalysts.

The gas pressure prevailing in the regenerator should be between 5 pounds per square inch and 140 pounds per square inch with about 40 pounds per square inch preferred.

Finally, the regenerated catalyst, which has fallen to chamber 4 is again purged and conditioned by superheated steam or the like introduced through valved conduit 40 and thereafter immediately discharged into hopper 15 and thence directly into the tail of the Redler conveyor for reintroduction into the cracking chamber 1.

Numerous modifications may be made in the invention as above disclosed without departing from the spirit thereof. For example, the catalyst conveyor need not be a "Redler" type, but might be a belt or bucket conveyor. The regeneration chamber 3 may be square, rectangular or circular in cross section. Furthermore, a powdered, granular or lump catalyst may be employed. In the case where a powdered catalyst is employed, the perforations in the casing of the conveyor and the flue walls may require reduction in diameter from about $1/16$ to $1/8$ of an inch. Various other modifications falling within the scope of the invention are permissible without departing from the spirit of the invention.

This case is filed as a division of my application Serial No. 265,388, filed April 1, 1939, now U. S. Patent 2,317,379 for Catalytic cracking apparatus.

I claim:

1. The method of continuously regenerating spent contact material containing carbonaceous deposits thereon which method comprises continuously introducing said contact material into a regeneration zone and continuously withdrawing contact material therefrom at such rates as to maintain a moving bed of contact material in said regeneration zone, continuously introducing air into said zone and continuously removing regeneration gas therefrom, maintaining a heat exchange zone adjacent the regeneration zone and substantially coextensive therewith, introducing a heat exchange medium into said heat exchange zone, withdrawing heated heat exchange medium from said heat exchange zone and transferring heat from contact material in all parts of said regeneration zone to said heat exchange zone by circulating a heat transfer medium throughout said regeneration zone and contacting said heat transfer medium with said heat exchange zone in the course of its circulation.

2. The method of claim 1 wherein the heat transfer medium comprises hot regeneration gases.

3. The method of continuously regenerating spent contact material containing carbonaceous deposits thereon, which method comprises passing said contact material through a regeneration zone in a substantially vertical moving bed retained between perforated walls, continuously passing hot inert and regenerating gases through said moving bed in a direction generally transverse to the movement of the contact material in said bed, adjusting the temperature of said gases prior to their passage through said bed and recycling at least a portion of said gases through said bed to control the temperature of the contact material during regeneration.

4. The method of continuously regenerating spent contact material containing carbonaceous deposits thereon, which method comprises passing said contact material through a regeneration zone in a substantially vertical moving bed retained between perforated walls, continuously passing hot inert and regenerating gases through said moving bed in a direction generally transverse to the movement of the contact material in said bed, adjusting the temperature of said gases prior to their passage through said bed and recycling said gases through said bed at such a rate to control the temperature of the regeneration reaction.

5. The method of continuously regenerating spent contact material containing carbonaceous deposits thereon, which method comprises passing said contact material through a regeneration zone in a substantially vertical moving bed retained between perforated walls, continuously passing regenerating gas through the moving bed in a direction generally transverse to the movement of the contact material in the bed, removing regeneration gas from the system, recycling at least a part of the removed regeneration gases through the bed and passing the recycled regeneration gas over cooling tubes alongside of said perforated walls and adjacent the moving bed before introducing it into the bed to control the temperature during regeneration.

6. A method of regenerating solid contact material which has become contaminated with carbonaceous deposits, which comprises passing the contact material by gravity in a relatively thin moving bed through a regeneration zone, passing hot regenerating gases through said moving bed in a direction generally transverse to the flow of said bed, continuously recycling a portion of withdrawn regeneration gases through said bed, adjusting the temperature of said recycled gases to control the temperature of said moving bed, continuously introducing an active regeneration gas into the recycled gas stream and continuously withdrawing spent regeneration gas from the system.

7. The method of continuously regenerating spent contact material containing carbonaceous deposits thereon, which method comprises passing said contact material through a regeneration zone in a substantially vertical moving bed retained between perforated walls, continuously passing regenerating oxygen-containing gas through the moving bed in a direction generally transverse to the movement of the contact material in the bed, removing regeneration gas from the system and recycling at least a portion of the removed regeneration gas to control the oxygen concentration of the regenerating gas being passed through said moving bed.

8. A method of regenerating solid contact material which has become contaminated with carbonaceous deposits, which comprises passing the contact material by gravity in a relatively thin moving bed through a regeneration zone, introducing oxygen-containing regenerating gas into the bottom portion of the bed whereby fresh regenerating gas contacts nearly regenerated contact material and passing the regenerating gas through the moving bed in a direction generally transverse to the flow of the bed and back and forth across the bed so that the oxygen content of the regenerating gas is reduced before the regenerating gas contacts highly contaminated catalyst near the upper portion of said bed.

9. A method of regenerating solid contact material which has become contaminated with carbonaceous deposits, which comprises passing the contact material by gravity in a relatively thin moving bed through a regeneration zone, passing hot regenerating gases back and forth through said moving bed in a direction generally transverse to the flow of the bed, cooling the regenerating gases after they have passed through the bed and again passing at least a portion of the regenerating gases through the bed.

10. A method of regenerating solid contact material which has become contaminated with carbonaceous deposits, which comprises passing the contact material by gravity in a relatively thin moving bed through a regeneration zone, passing hot regenerating gases through said moving bed in a direction generally transverse to the flow of the bed a plurality of times and cooling the regeneration gases after they have passed through the bed and before they are again passed through the bed.

11. A method of regenerating solid contact material which has become contaminated with carbonaceous deposits, which comprises passing the contact material by gravity in a plurality of relatively thin beds moving through a regeneration zone, passing hot regenerating gas back and forth across each moving bed in a direction generally transverse to the flow of the beds and passing the regenerating gas over cooling tubes after it passes across each bed to control the temperature of the regenerating gas.

12. A method according to claim 11 wherein a portion of the regenerating gas in admixture with active regenerating gas is recycled through at least one of the beds.

13. A method of regenerating solid contact material which has become contaminated with carbonaceous deposits, which comprises passing the contact material by gravity in a relatively thin moving bed through a regeneration zone, passing an oxidizing gas through the moving bed in a direction generally across the bed, passing the oxidizing gas over cooling tubes alongside the moving bed and containing a heat exchange medium so that heat is absorbed from the oxidizing gas, passing the cooled oxidizing gas through the bed and again cooling the gas.

14. The method of effecting rapid regeneration of solid contact material which has become contaminated with carbonaceous deposits, which method comprises passing said contact material by gravity in a relatively thin moving bed through a regeneration zone, passing hot gases through said moving bed in a direction generally transverse to the flow of said bed, continuously recycling said gases through said bed, adjusting the temperature of said recycled gases to maintain a desired regeneration temperature in said moving bed, continuously introducing an active regeneration gas into the recycled gas stream and continuously withdrawing spent regeneration gas from the system.

15. The method of continuously regenerating spent contact material containing carbonaceous deposits thereon, which method comprises passing said contact material through a regeneration zone in a substantially vertical moving bed retained between perforated walls, continuously passing hot inert and regenerating gases through said moving bed in a direction generally transverse to the movement of the contact material in said bed, adjusting the temperature of said gases prior to their passage through said bed and continuously recycling said gases through said bed a plurality of times to maintain the temperature of the contact material in the moving bed below a maximum temperature of about 1150° F.

16. The method of continuously regenerating spent contact material containing carbonaceous deposits thereon, which method comprises passing said contact material through a regeneration zone in a substantially vertical moving bed retained between perforated walls, continuously passing hot inert and regenerating gases through said moving bed in a direction generally transverse to the movement of the contact material in said bed, adjusting the temperature of said gases prior to their passage through said bed and continuously recycling said gases through said bed to control the regeneration reaction and to maintain the temperature of the contact material below a maximum temperature.

17. The method of continuously regenerating spent contact material containing carbonaceous deposits thereon, which method comprises passing said contact material through a regeneration zone in a substantially vertical moving bed retained between perforated walls, continuously passing hot inert and regenerating gases through said moving bed in a direction generally transverse to the movement of the contact material in said bed, adjusting the temperature of said gases prior to their passage through said bed and continuously recycling said gases through said bed to control the temperature of the regeneration reaction.

18. The method of effecting rapid regeneration of solid contact material which has become contaminated with carbonaceous deposits, which method comprises passing said contact material by gravity in a relatively thin moving bed through a regeneration zone, passing hot gases through said moving bed in a direction generally transverse to the flow of said bed, continuously recycling said gases through said bed, adjusting the temperature of the recycled gases by passing the gases over cooling tubes alongside and adjacent to moving bed to control the temperature of the contact material in the moving bed, continuously introducing an active regeneration gas into the recycled gas stream and continuously withdrawing spent regeneration gas from the system.

19. The method according to claim 3 which includes the further steps of introducing an oxygen-containing gas into the gases which are recycled and withdrawing regeneration gases from the system.

20. The method according to claim 14 wherein the recycled gas stream containing active regeneration gas is first contacted with the lower portion of said moving bed and spent regeneration gas is withdrawn from an upper portion of said moving bed.

21. The method according to claim 14 wherein the recycled gas stream comprises at least part of the spent regeneration gas withdrawn from the system.

22. The method according to claim 7 wherein the active regenerating gas containing oxygen is first contacted with the lower portion of said moving bed and regeneration gas is removed from the upper portion of said moving bed.

CHARLES E. HEMMINGER.